(12) United States Patent
Cortes-Concepcion et al.

(10) Patent No.: US 9,725,317 B2
(45) Date of Patent: Aug. 8, 2017

(54) USE OF TRIAMMONIUM SALT OF AURIN TRICARBOXYLIC ACID AS RISK MITIGANT FOR ALUMINUM HYDRIDE

(71) Applicant: Savannah River Nuclear Solutions, LLC, Aiken, SC (US)

(72) Inventors: Jose A. Cortes-Concepcion, Aiken, SC (US); Donald L. Anton, Aiken, SC (US)

(73) Assignee: SAVANNAH RIVER NUCLEAR SOLUTIONS, LLC, Aiken, SC (US)

( * ) Notice: Subject to any disclaimer, the term of this patent is extended or adjusted under 35 U.S.C. 154(b) by 77 days.

(21) Appl. No.: 13/720,321

(22) Filed: Dec. 19, 2012

(65) Prior Publication Data

US 2014/0170048 A1    Jun. 19, 2014

(51) Int. Cl.
*C01B 6/34*      (2006.01)
*C01B 6/06*      (2006.01)

(52) U.S. Cl.
CPC . *C01B 6/34* (2013.01); *C01B 6/06* (2013.01)

(58) Field of Classification Search
CPC .............. C01B 6/003; C01B 6/34; C01B 6/06
See application file for complete search history.

(56) References Cited

U.S. PATENT DOCUMENTS

| | | | |
|---|---|---|---|
| 3,869,544 A | 3/1975 | Niles et al. | |
| 6,228,338 B1 * | 5/2001 | Petrie et al. | 423/265 |
| 6,410,338 B1 | 6/2002 | Lippold et al. | |
| 6,572,836 B1 * | 6/2003 | Schulz et al. | 423/648.1 |
| 6,617,064 B2 | 9/2003 | Petrie et al. | |
| 6,984,746 B2 * | 1/2006 | Lund et al. | 556/170 |
| 7,238,336 B2 | 7/2007 | Lund et al. | |

OTHER PUBLICATIONS

"Preparation and Electrichemical Properties of Sulfur-Acetylene Black Composites as Cathode Materials," Electrochimica Acta, May 2009.

* cited by examiner

*Primary Examiner* — Anthony J Zimmer
*Assistant Examiner* — Syed Iqbal
(74) *Attorney, Agent, or Firm* — J. Bennett Mullinax, LLC

(57) ABSTRACT

A process and a resulting product by process of an aluminum hydride which is modified with by physically combining in a ball milling process an aluminum hydride with a triammonium salt of aurin tricarboxylic acid. The resulting product is an aluminum hydride which is resistant to air, ambient moisture, and liquid water while maintaining useful hydrogen storage and release kinetics.

11 Claims, No Drawings

USE OF TRIAMMONIUM SALT OF AURIN TRICARBOXYLIC ACID AS RISK MITIGANT FOR ALUMINUM HYDRIDE

STATEMENT AS TO RIGHTS TO INVENTIONS MADE UNDER FEDERALLY SPONSORED RESEARCH AND DEVELOPMENT

This invention was made with Government support under Contract No. DE-AC09-08SR22470 awarded by the United States Department of Energy. The Government has certain rights in the invention.

FIELD OF THE INVENTION

This invention is directed towards a method for modifying an aluminum hydride with a triammonium salt of aurin tricarboxylic acid. The modified aluminum hydride shows no reactivity exposed to air (ambient moisture) and water thereby improving the safety of the alane. The modified alane shows comparable hydrogen storage capacity and dehydrogenation kinetics.

BACKGROUND OF THE INVENTION

It is known in the art to use solvent-based systems to bring about changes to aluminum hydride materials. U.S. Pat. Nos. 7,238,336 and 6,984,746 to Lund et al. disclose solvent-based systems for production of an α-alane using an aurin tricarboxylic acid. However, solvent-based systems have inherent problems in terms of use of undesired chemicals and residue solvents and which may persist in an end product.

U.S. Pat. Nos. 6,617,064 and 6,228,838 to Petrie et al. also address surface stabilizers for aurin tricarboxylic acid solvent additives that need to be added during heating cycles, acid wash steps or through a slow evaporation of slurry additive. While the surface stabilizers refer to a thermal stability over time, it is unclear what effect such stabilizers may have on the aluminum hydrides with respect to exposure to air and moisture.

U.S. Pat. No. 3,869,544 to Niles discloses a stabilization process for aluminum hydride using various additives and solvent-based systems. However, the art does not provide for a simple mechanical mixing step which will render aluminum hydride in a stabilized form with respect to ambient moisture and water. As such, there remains room for improvement and variation within the art.

SUMMARY OF THE INVENTION

It is one aspect of at least one of the present embodiments to provide for a stabilized alane which is resistant to ambient moisture and liquid water and is formed from a stabilization process that does not involve solvents.

It is a further aspect of at least one embodiment of this invention of providing a stabilized alane such as aluminum hydride which involves a mechanical intermixing of the alane with triammonium salt of aurin tricarboxylic acid.

It is further aspect of at least one of the present embodiments of the invention to provide for a mechanical based stabilization process for an alane which does not degrade the hydrogen release and adsorption kinetics of the Mane.

It is yet a further and more particular aspect of at least one embodiment of the present invention to provide for a moisture stabilization process and product by the process of an alane having at least a surface of the alane being stabilized by ball milling in the presence of triammonium salt of aurin tricarboxylic acid.

It is yet a further and more particular aspect of at least one embodiment of the present invention to provide for a solvent free stabilized alane which is substantially nonreactive with ambient humidity or exposure to liquid water.

It is yet a further and more particular aspect of at least one embodiment of the present invention to provide for a process of stabilizing a hydride with, respect to exposure to air and water comprising providing a supply of, a hydride;
  introducing into the hydride an effective amount of a triammonium salt of aurin tricarboxylic acid;
  ball milling the hydride and triammonium salt of aurin tricarboxylic acid wherein following ball milling, the hydride is resistant to water and exposure to air. Further, the effect amount of triammonium salt of aurin tricarboxylic acid is about 20-weight % relative to the hydride. An effective amount of triammonium salt of aurin tricarboxylic acid can range from 5% to about 20% of triammonium salt of aurin tricarboxylic acid.

It is yet a further and more particular aspect of at least one embodiment of the present invention to provide for moisture and water resistant aluminum hydride comprising an aluminum hydride particle having an exterior surface of the particle coated with a triammonium salt of aurin tricarboxylic acid wherein the coated aluminum hydride is stable when exposed to water.

It is yet a further and more particular aspect of at least one embodiment of the present invention to provide for a moisture and water resistant aluminum hydride consisting essentially of an aluminum hydride particle having an exterior surface of the particle coated with a triammonium salt of aurin tricarboxylic acid wherein the coated aluminum hydride is stable when exposed to water.

These and other features, aspects, and advantages of the present invention will become better understood with reference to the following description and appended claims.

DESCRIPTION OF THE PREFERRED EMBODIMENT

Reference will now be made in detail to the embodiments of the invention, one or more examples of which are set forth below. Each example is provided by way of explanation of the invention, not limitation of the invention. In fact, it will be apparent to those skilled in the art, that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. Other objects, features, and aspects of the present invention are disclosed in the following detailed description. It is to be understood by one of ordinary skill in the art that the present discussion is a description of exemplary embodiments only and is not intended as limiting the broader aspects of the present invention, which broader aspects are embodied in the exemplary constructions.

In accordance with this invention, it has been found that physically co-processing triammonium salt of aurin tricarboxylic acid with aluminum hydride results in a material having essentially no reactivity towards water and air. The co-processing of the triammonium salt of aurin tricarboxylic acid and aluminum hydride involve conventional ball milling techniques including the use of planetary mills, high energy/attrition ball milling, jar milling, and use of SPEX™ mechanical milling apparatuses.

According to this invention, it has been found that one useful method involved the use of a SPEX™ mill using 10:1 ball sample weight ratio and a mixture of aluminum hydride and 20% triammonium salt of aurin tricarboxylic acid. The triammonium salt of aurin tricarboxylic was obtained from Sigma-Aldrich and was ball milled to reduce particle size prior to addition to the aluminum hydride. Aluminum hydride was obtained from Dow Chemical with an average size of 100 microns prior to ball milling. Other sizes of aluminum hydride particles, ranging from 40 microns to 100 microns, were also evaluated, the initial micron size being before ball milling with the triammonium salt of aurin tricarboxylic acid.

Following ball milling of the aluminum hydride and the triammonium salt of aurin tricarboxylic acid, the resulting ball milled product is in the form of fine particles exhibiting a slight pink color and showing a high level of hydrophobicity as evidence by the surface tension of the treated aluminum hydride. It is believed that the highly hydrophobic nature of the treated aluminum hydride is a result of a surface tension with the salt which establishes a barrier against water and air. To the extent any aluminum metal is formed during the mechanical ball milling process, it is believed that, the aluminum metal is coordinated by the salt.

For control purposes, the modified material was milled under identical conditions. A comparison of the modified aluminum hydride with the control indicated that the modified material do not ignite under standard water drop test as opposed to the unmodified material. Further, material is stable under ambient laboratory conditions to not react with ambient moisture or lose hydrogen adsorption/desorption capabilities on exposure to air.

Thermogravimetric analysis of modified and controlled samples showed comparable kinetics on both materials based upon the weight amount of aluminum hydride in the respective samples.

While not wishing to be limited by theory, it is believed that the physical milling process of triammonium salt of aurin tricarboxylic acid with aluminum hydride results in a mechanical/chemical modification of surfaces of the aluminum hydride particle by the surface coating of the triammonium salt of aurin tricarboxylic acid. The surface coating provides a protective environment against moisture which would typically degrade the aluminum hydride. Equally important is the fact that the modified aluminum hydride shows no appreciable lose in hydrogen storage and release kinetics.

Similar experiments were done with a 10% loading of triammonium salt of aurin tricarboxylic acid using a SPEX milling process followed by jar milling. Similar observations of a formed surface coating of the salt on the aluminum hydride was observed which protected the aluminum hydride from air and moisture. Based upon these observations, it is Applicant's belief that loading levels as low as 5 weight % of the salt relative to the aluminum hydride would be effective. Using the methodologies described above, one having ordinary skill in the art would be able to establish effective upper and lower limits of loading levels and variation in milling or processing times so as to achieve an effective protective coating for the aluminum hydride. The coating process is believed suitable with all crystalline forms of alane. Further, it is believed that other hydrides such as $MgH_2$ can also be modified as described herein. Using methodology above, one having ordinary skill in the art can, without undue experimentation, can evaluate hydrides that are reactive with air or moisture and determine whether the treatment with a triammonium salt of aurin tricarboxylic acid achieves a desired surface coating and which reduces reactivity of the hydride to moisture in air and to liquid water.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention which is set forth in the following claims. In addition, it should be understood that aspects of the various embodiments may be interchanged, both in whole, or in part. Therefore, the spirit and scope of the appended claims should not be limited to the description of the preferred versions contained therein.

That which is claimed:

1. A process of stabilizing a hydride with respect to exposure to air and water comprising:
   providing a supply of a hydride;
   introducing into said hydride an effective amount of a moisture and water resistant agent of a triammonium salt of aurin tricarboxylic acid without use of a solvent;
   high energy ball milling the hydride and triammonium salt of aurin tricarboxylic acid at ambient conditions to modify surfaces of the hydride by a surface coating of the triammonium salt of aurin tricarboxylic acid wherein following ball milling, the hydride is more stable than before the ball milling by reducing reactivity of the hydride to water and exposure to air.

2. The process according to claim 1 wherein an effective amount of triammonium salt of aurin tricarboxylic acid is about 20-weight % relative to the aluminum hydride.

3. The process according to claim 1 wherein an effective amount of triammonium salt of aurin tricarboxylic acid can range from about 5% to about 20% of triammonium salt of aurin tricarboxylic acid.

4. The process according to claim 1 wherein the hydride is selected from the group consisting of aluminum hydride and magnesium hydride.

5. The process according to claim 1, further comprising ball milling the triammonium salt of aurin tricarboxylic acid before introducing the triammonium salt of aurin tricarboxylic acid into said hydride.

6. The process according to claim 1, wherein the step of ball milling the hydride and triammonium salt of aurin tricarboxylic acid comprises mechanically modifying the surfaces of the hydride by the surface coating of the triammonium salt of aurin tricarboxylic acid.

7. The process according to claim 1, wherein the step of ball milling the hydride and triammonium salt of aurin tricarboxylic acid comprises chemically modifying the surfaces of the hydride by the surface coating of the triammonium salt of aurin tricarboxylic acid.

8. The process according to claim 1, wherein the step of ball milling the hydride and triammonium salt of aurin tricarboxylic acid comprises mechanically and chemically modifying the surfaces of the hydride by the surface coating of the triammonium salt of aurin tricarboxylic acid.

9. A moisture and water resistant aluminum hydride comprising:
   a ball milled coated aluminum hydride particle having an exterior surface of the particle coated with a triammonium salt of aurin tricarboxylic acid and formed by high energy ball milling at ambient conditions the aluminum hydride with the triammonium salt of aurin tricarboxylic acid without use of a solvent or a slurry resulting in a modification of the exterior surface of the aluminum hydride particle by a surface coating of the triammonium salt of aurin tricarboxylic acid wherein the ball milled coated aluminum hydride particle is more stable when exposed to water as compared to aluminum hydride particles that are not ball milled with a triammonium salt of aurin tricarboxylic acid by reducing reactivity of the hydride to moisture in air and to liquid water.

10. A moisture and water resistant aluminum hydride consisting essentially of:
a ball milled coated aluminum hydride particle formed by high energy ball milling at ambient conditions the aluminum hydride in the presence of triammonium salt of aurin tricarboxylic acid without use of a solvent or a slurry resulting in a mechanical and chemical modification of surfaces of the aluminum hydride particle by a surface coating of the triammonium salt of aurin tricarboxylic acid wherein the ball milled coated aluminum hydride particle is more stable when exposed to water as compared to aluminum hydride particles that are not ball milled with a triammonium salt of aurin tricarboxylic acid by reducing reactivity of the hydride to moisture in air and to liquid water.

11. The moisture and water resistant aluminum hydride according to claim 9, wherein the ball milling of the aluminum hydride with the triammonium salt of aurin tricarboxylic acid without use of a solvent results in a mechanical and chemical modification of the exterior surface of the aluminum hydride particle by the surface coating of the triammonium salt of aurin tricarboxylic acid.

* * * * *